United States Patent [19]

Miyauchi

[11] Patent Number: 5,627,783
[45] Date of Patent: May 6, 1997

[54] SEMICONDUCTOR DISK DEVICE

[75] Inventor: Shigenori Miyauchi, Tokyo, Japan

[73] Assignee: Mitsubishi Denki Kabushiki Kaisha, Tokyo, Japan

[21] Appl. No.: 580,410

[22] Filed: Dec. 28, 1995

[30] Foreign Application Priority Data

Jan. 31, 1995 [JP] Japan .................................. 7-014030

[51] Int. Cl.$^6$ .................................................. C11C 13/00
[52] U.S. Cl. ................. 365/185.33; 365/218; 365/230.03
[58] Field of Search .......................... 365/185.33, 218, 365/238.5, 230.03

[56] References Cited

U.S. PATENT DOCUMENTS 5,065,364  11/1991  Atwood ........................... 365/185.33

FOREIGN PATENT DOCUMENTS 522780  1/1993  European Pat. Off. .
527924  2/1993  Japan .

Primary Examiner—Terrell W. Fears
Attorney, Agent, or Firm—Leydig, Voit & Mayer

[57] ABSTRACT

A semiconductor disk device comprising a flash memory having a plurality of blocks, and a CPU for converting a logical sector address into a physical-logical block number and its offset value, for searching for a block and a data memory area in the flash memory based on the physical-logical block number and offset value, and for reading the content of the data memory area when no chain data is stored in an update data chain information memory area. The block comprises a physical-logical block memory area, a plurality of data memory areas for storing data, data status flag memory areas, one disposed corresponding to each of the data memory areas, for storing a data status flag that indicates whether the data memory area stores data, and update data chain information memory areas, one disposed corresponding to each of the data memory areas, for storing chain information indicative of the destination of data.

The address conversion table for memory management is dispensed with and, accordingly, the data areas are expanded.

9 Claims, 16 Drawing Sheets

| PLBN | PBN |
|---|---|
| 1 | 3 |
| 2 | 8 |
| 3 | n |
| ⋮ | ⋮ |
| n−1 | |
| n | |

| LSA | PSA |
|---|---|
| 1 | 6 |
| 2 | 1 |
| 3 | 3 |
| 4 | n |
| 5 | 5 |
| ⋮ | ⋮ |
|  |  |
|  |  |
| n−1 |  |
| n |  |

SEMICONDUCTOR DISK DEVICE

BACKGROUND OF THE INVENTION

1. Field of the Invention

The present invention relates to a semiconductor disk device such as a semiconductor disk card that uses a flash memory as its storage medium.

2. Description of the Related Art

In the personal computer field, today, magnetic storage media such as hard disks are in widespread use to store relatively large amounts of data. Although the power consumption of hard disk drives are large, they offer excellent cost performance.

Semiconductor disk drive apparatuses have been introduced which drive a semiconductor memory such as a flash memory in a manner similar to the manner in which the hard disk drive apparatus drives a hard disk. Unlike the hard disk drive, the semiconductor disk drive contains no mechanical parts such as a motor. Although the semiconductor disk device is outperformed by the magnetic storage medium system in cost performance, the semiconductor disk device presents advantages in power consumption and reliability over the magnetic storage system. Thus, the demand for the semiconductor disk device is growing, in particular, in the portable information terminal field.

The flash memory has the following features. First, the flash memory is a non-volatile memory electronically programmable and erasable. Second, the flash memory accepts no data overwriting on a memory cell that is already programmed with data (thus, a programming operation is always associated with an erasing operation). Third, the unit of erasing ranges from a few bytes to tens of K bytes. Fourth, there is a limitation on program/erase cycles.

Referring to FIGS. 10 through 13, a prior art semiconductor disk device is discussed. FIGS. 10 through 13 show a known semiconductor disk device disclosed in Japanese Patent Laid-Open 5-27924. FIG. 10 is a block diagram showing generally the prior art semiconductor disk device. FIG. 11 shows the internal construction of an address conversion table of the device of FIG. 10. FIG. 12 shows the internal construction of the flash memory of the device of FIG. 10. FIG. 13 shows the internal construction of the block of the flash memory of FIG. 12.

As shown in FIG. 10, the prior art semiconductor disk device 2 comprises an interface circuit 3, CPU 4, an address conversion table 5, a flash control circuit 6, a data input/output sector buffer 7, and a flash memory 8. CPU 4 is constructed of MCU, ROM, RAM, I/O port and the like.

The host system 1 that is connected to the semiconductor disk device 2 is typically a notebook computer or a portable information terminal. Most of the semiconductor disk devices 2 are currently of a removable-card type. The interface circuit 3 performs information exchange with the host system 1. CPU 4 controls data input and output and issues instructions to the flash memory 8.

The logical sector/physical sector address conversion table 5 is a table that converts a logical sector address (LSA) into a physical sector address (PSA). LSA is a sector address the host system 1 specifies to the semiconductor disk device 2. PSA is an address in the flash memory 8 used in the semiconductor disk device 2.

The flash control circuit 6 performs simple data processing for the flash memory 8. For example, simple data exchange is accomplished by the flash control circuit 6, and the rest of the processing is accomplished by CPU 4. The data input/output sector buffer 7 is used to output data from the flash memory 8 through the interface circuit 3 or input data through the interface circuit 3 into the flash memory 8.

In FIG. 11, the address conversion table 5 is constructed of an LSA storage section and a PSA storage section.

The LSA storage section stores the logical sector addresses. Their contents are fixed. The PSA storage section stores arbitrary sector numbers (1 through n in FIG. 11) for the flash memory 8. The use of the address conversion table 5 allows data to be written on the physical sector addresses in a way convenient for internal data management, without the need for paying attention to the logical address specified by the host system 1. The address conversion table 5 is typically constructed of an SRAM, because it is frequently programmed and erased.

The capacity of the address conversion table 5 is determined as follows. Assuming that a flash memory 8 of 20 megabytes is used and that the unit of data for input and output (sector) is 512 bytes, the number of sectors in the semiconductor disk device 2 is calculated as follows:

Number of sectors in the semiconductor disk device 2=20 megabytes /512 bytes=40960 sectors The number of bits required to express 40960 in binary is as follows:

ln 40960/ln 2=15.3

To express 40960, 16 bits are required.

The necessary capacity of the address conversion table 5 is 40960×16=655360 bits. In conclusion, the necessary capacity is 80 kilobytes.

In FIG. 12, the flash memory 8 is constructed of a plurality of blocks 9 and a plurality of backup blocks 9.

The flash memory 8 is a non-volatile memory electronically programmable and erasable. Because of its non-volatility, the flash memory 8 requires no backup battery, unlike DRAM and SRAM. Since the flash memory 8 has an electronically erasable capability, data modification is performed without detaching the flash memory 8 from its board, unlike EPROM. Since a single cell stores one bit data, the manufacturing cost required is lower than that for an EEPROM. These are advantages of the flash memory 8. Its disadvantages: the maximum erase cycles permitted is somewhere between 100000 and 1000000 times; each write operation must be associated with an erase operation (data overwriting onto a cell that has already stored data is not permitted); and erasing operation is performed by block and the block, namely, the unit of erasing ranges from a few kilobytes to tens of kilobytes.

As shown in FIG. 13, each block 9 has a block information memory area 10 on its header, a plurality of data memory areas 11 and a plurality of LSA memory areas 12.

The erase information memory area 10 stores the current block erase count. Each of the data memory areas 11 is typically 512 bytes (=one sector) large. Each sector is associated with an LSA memory area 12. When writing data, the LSA memory area 12 stores the LSA specified by the host system 1. If the logical sector/physical sector address conversion table 5 is made of an SRAM, data will be lost when power is cut off. When power is back on, the SRAM table 5 is reconstructed by searching all sectors in the LSA memory areas 12.

Referring to FIGS. 14, 15 and 16, the operation of the prior art semiconductor disk device is discussed. FIG. 14 is an explanatory diagram showing the read operation by the prior art semiconductor disk device. FIGS. 15 and 16 are explanatory diagrams showing the write operation by the prior art semiconductor disk device.

Unlike the hard disk system, the semiconductor disk device 2 employing the flash memory 8 is unable to overwrite data. Thus, the SRAM stores the address conversion table 5 that indicates the logical sector address of the data sent from the host system 1 and which physical sector address in the flash memory 8 is used for storage of the data. The use of the table 5 permits an efficient use of the memory areas of the flash memory 8.

Referring to FIG. 14, the data read operation of the semiconductor disk device 2 is discussed. The host system 1 sends to the semiconductor disk device 2 the sector address of the data to be read. The address data sent from the host system 1 is arranged in two kinds of format: LSA and CHS. The LSA format specifies each sector by a serial number from 1 through n. The CHS format specifies each data area by a combination of three data, namely, of a cylinder, a head and a sector used in the hard disk system. The semiconductor disk device 2 employs the LSA/PSA address conversion table 5. When the host system 1 sends the CHS formatted data, the interface circuit 3 converts it into LSA formatted data before next processing step.

CPU 4 address converts the LSA specified by the host system 1 into the PSA, referring to the address conversion table 5. Finally, the data corresponding to the PSA is read from the flash memory 8.

When the LSA specified by the host system 1 is 2, for example, the address conversion table 5 converts it into a PSA of 6. Accordingly, the data, A, is read. The LSA memory area 12 of the PSA, 6, stores 2 as its LSA.

The write operation of the semiconductor disk device 2 is discussed referring to FIGS. 15 and 16. Suppose that data, A, B, and C are stored, respectively, in PSAs 1, 3, and 7 in the initial condition of the device. It should be noted that the flash memory 8 permits no data overwriting in its write operation. In the above initial condition, PSAs 1, 3 and 7 are prohibited from overwriting.

When the host system 1 specifies an LSA with no data written, CPU 4 writes data on any appropriate empty area (PSAs 2, 4 through 6, and 8 through 12), and updates the data in the address conversion table 5. FIG. 15 shows that the host system 1 instructs the writing of data D onto the LSA 4. Data D and the LSA specified by the host system 1 are written on the PSA 4, and the PSA, 4, is written on the address corresponding to the LSA 4 in the address conversion table 5.

When the host system 1 instructs the writing onto the area having data (for example, writing is attempted under the same file name already existing), the data to be written is written onto an empty area in the flash memory 8, and the address conversion table 5 is updated. FIG. 16 shows the result of the writing of LSA 2. Update data B' is written onto the empty PSA 5, and the PSA area corresponding to the LSA 2 in the address conversion table 5 is changed to 5. The CPU 4 in the card should know that the PSA 3 is the data already used.

In the above described semiconductor disk device, the address conversion table 5 needs the memory area for storing a single PSA on the basis of a sector (the unit of data for data management). As the capacity of the flash memory 8 increases, the capacity of the address conversion table 5 must be increased accordingly.

SUMMARY OF THE INVENTION

The present invention has been developed with a view to the above-described problem. It is an object of the present invention to provide a semiconductor disk device that requires no address conversion table for memory management.

It is another object of the present invention to provide a semiconductor disk device having a reduced-capacity address conversion table.

The semiconductor disk device according to the present invention comprises a non-volatile, electronically programmable and erasable flash memory that is erased by the unit of block, interface means for exchanging data and address with an external system, flash control buffer means for performing data exchange between the flash memory and the interface means, and access means for converting the logical sector address coming in from the external system into a logical block number and for accessing the flash memory according to the logical block number.

In the semiconductor disk device according to the present invention, said flash memory comprises a plurality of blocks, each block comprising a physical-logical block number memory area for storing a physical-logical block number and a plurality of data memory areas for storing data, and said access means converts the logical sector address coming in from the external system into the physical-logical block number and its offset value and searches the block having the same physical-logical block number to access target data.

The address conversion table for memory management is thus dispensed with, and the data area is accordingly expanded.

The semiconductor disk device according to the present invention further comprises an address conversion table for converting a logical block number into a physical block number, whereby said flash memory comprises a plurality of blocks, each block comprising a physical-logical block number memory area for storing a physical-logical block number and a plurality of data memory areas for storing data, and said access means converts the logical sector address coming in from the external system into the physical-logical block number and its offset value, converts said converted physical-logical block number into a physical block number referring to the address conversion table, and accesses target data based on the physical block number and the offset value.

The address conversion table for memory management is thus reduced in size, and the data area is accordingly expanded.

BRIEF DESCRIPTION OF THE DRAWINGS

FIG. 9 shows the construction of the address conversion table according to embodiment 2 of the present invention.

Figure 11:
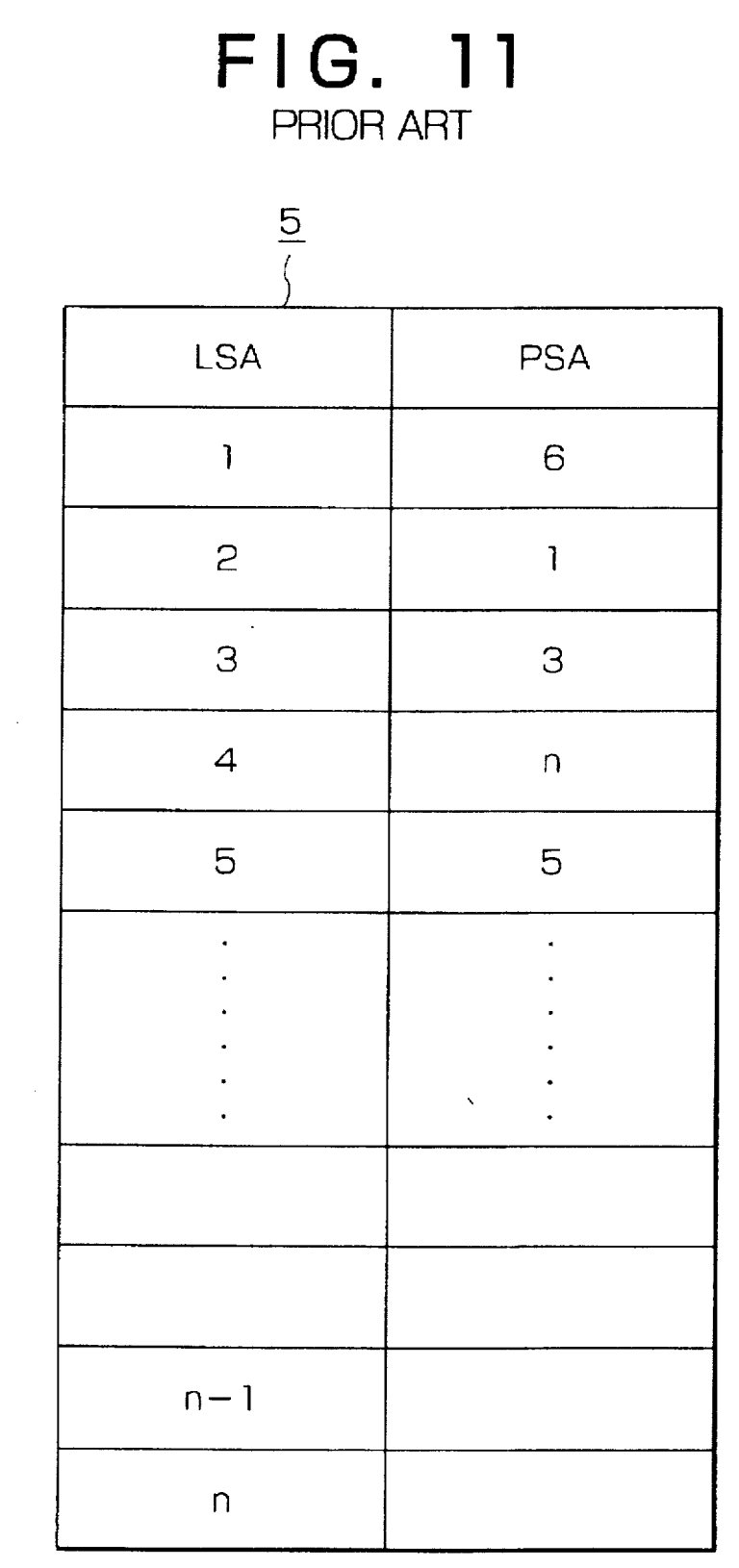

FIG. 11 shows the construction of the address conversion table of the prior art semiconductor disk device.

Figure 15:
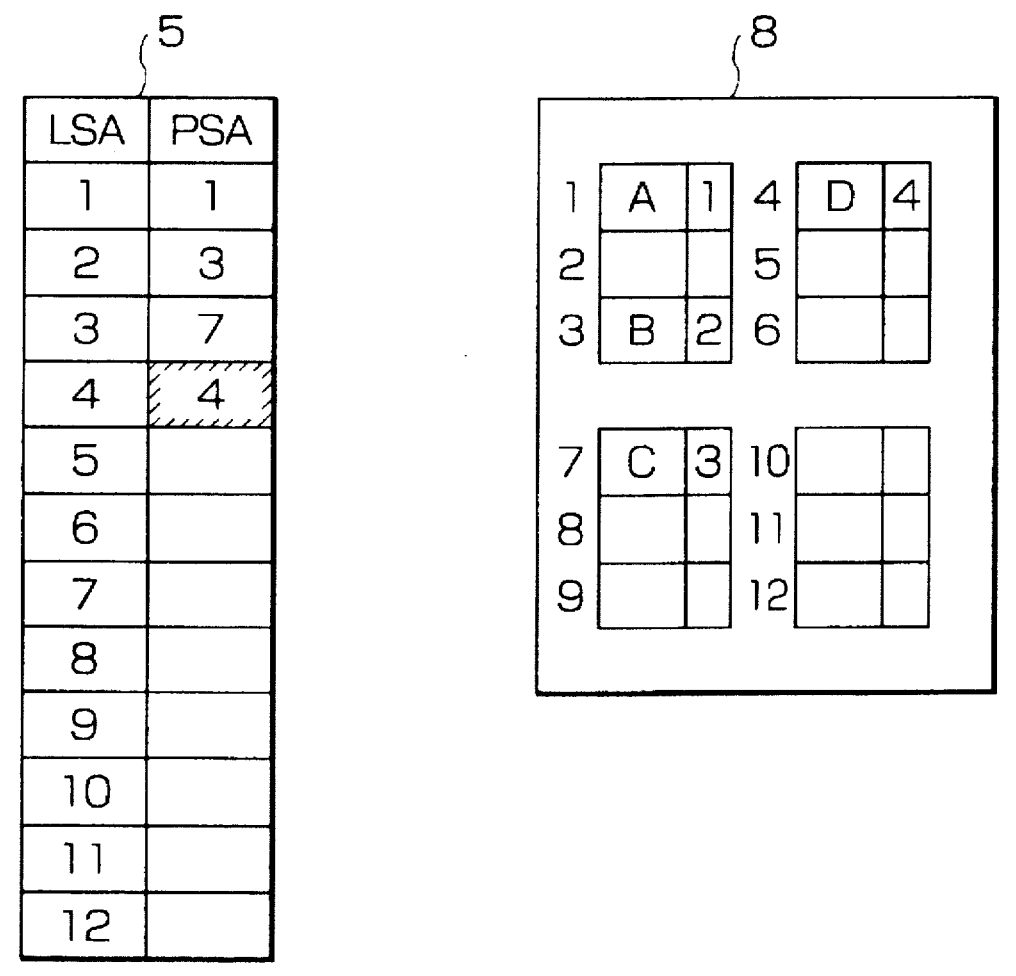

FIG. 15 shows the data write operation of the prior art semiconductor disk device.

Figure 16:
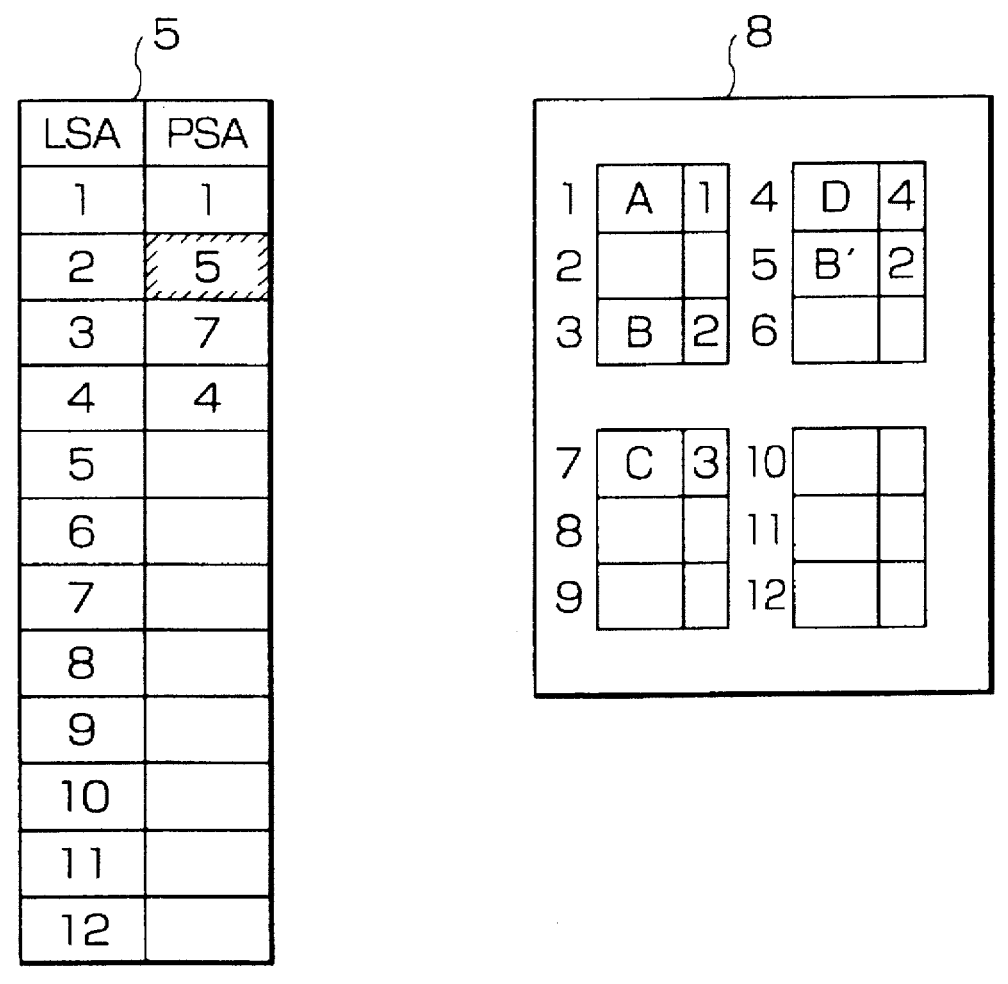

FIG. 16 shows the data write operation of the prior art semiconductor disk device.

DESCRIPTION OF THE PREFERRED EMBODIMENTS

Embodiment 1

Figure 1:
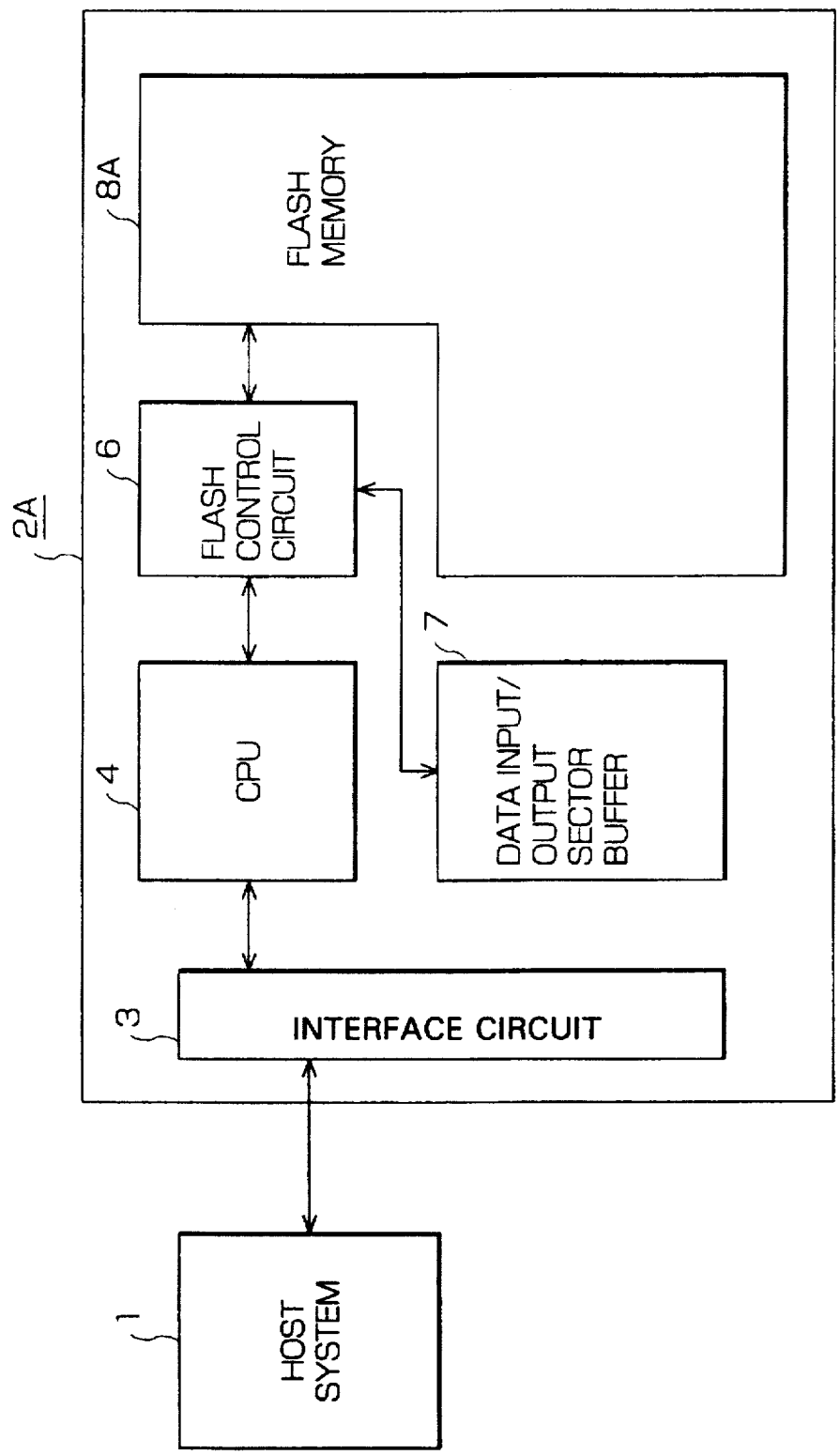
FIG. 1 is a block diagram showing generally the construction of embodiment 1 of the present invention.
Figure 2:
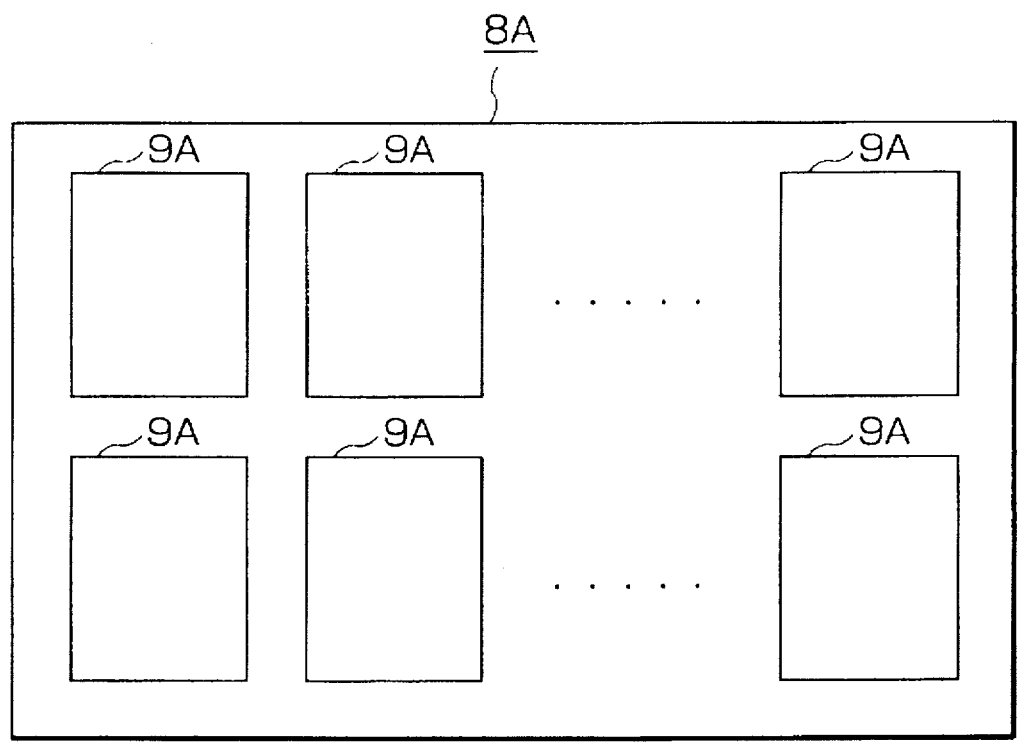
FIG. 2 shows the internal construction of the flash memory of embodiment 1 of the present invention.
Figure 3:
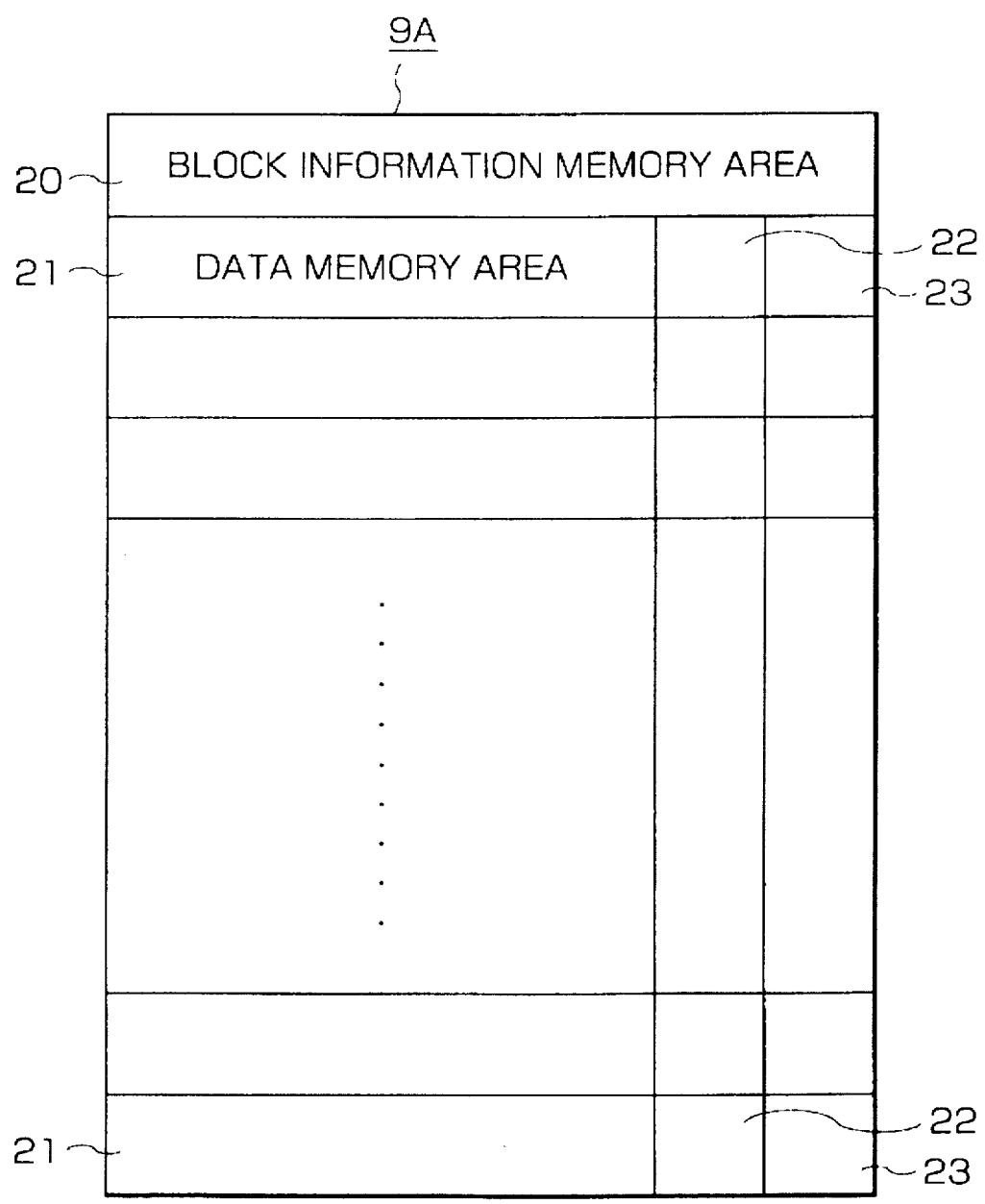
FIG. 3 shows the construction of the block in the flash memory according embodiment 1 of the present invention.
Figure 4:
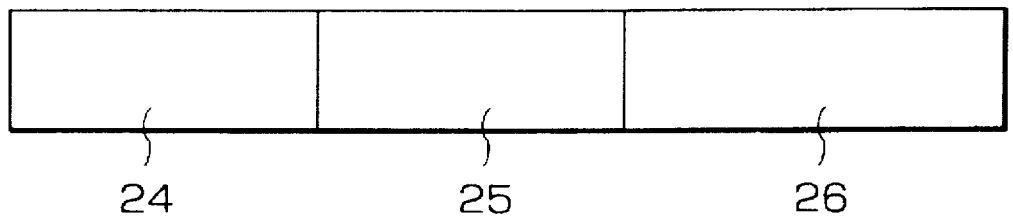
FIG. 4 shows the block information memory area in the erase block according to embodiment 1 of the present invention.

The first embodiment of the present invention is now discussed referring to FIGS. 1 through 4. FIG. 1 is a block diagram showing generally the construction of the first embodiment of the present invention. FIG. 2 shows the internal construction of the flash memory in the device of FIG. 1. FIG. 3 shows the internal construction of the block in the flash memory of FIG. 2. FIG. 4 shows the internal construction of the block information memory area of the erase block of FIG. 3. Identical or similar parts are designated by the same reference numerals throughout the figures.

In FIG. 1, the semiconductor disk device 2A of the first embodiment comprises an interface circuit 3, CPU 4, a flash control circuit 6, a data input/output sector buffer 7, and a flash memory 8A. CPU 4, constituting the access means, comprises MCU, ROM, RAM and an I/O port. The flash control circuit 6 and the data input/output sector buffer 7 constitute flash control buffer means.

One of the differences between the semiconductor disk devices 2 and 2A is that the semiconductor disk device 2A has no logical sector/physical sector address conversion table. Accordingly, the capacity of the flash memory 8A is increased.

In FIG. 2, the flash memory 8A is constructed of a plurality of blocks 9A and a plurality of backup blocks 9A.

The flash memory 8A as the main memory is of a block erase type flash memory (the unit of erase block is 64 kilobytes). The construction of the internal blocks in the flash memory remains unchanged from the prior art.

In FIG. 3, each block 9A comprises a block information memory area 20 at its header portion, a plurality of data memory areas 21, data state flags 22, one for each data memory area 21, and update data chain information (chain data) memory areas 23. Each update data chain information memory area 23 stores the logical block number of a destination to which data is transferred for update, and its offset value (sector address in the block). Each of the data memory areas 21 is typically 512 bytes large (=one sector).

Each data state flag 22 stores the data indicative of the state of the respective data memory area 21. Four states of the data memory area 21 are contemplated: empty memory area, occupied memory area (with chain data), occupied memory area (without chain data), used memory area (its content is already copied to other memory area for update there and ready for erasing).

Each state is expressed by a combination of bits. For example, 000 for an empty memory area, 001 for an occupied memory area (without chain data), 011 for an occupied memory area (with chain data), and 111 for used memory area. Since the flash memory 8A is incapable of overwriting, such bit combination is used (bits 010 cannot be used).

The chain data is used when the host system 1 issues an overwrite instruction on the same memory area. Since the flash memory 8A has no overwrite capability, data is written in another memory area that is empty when data overwriting is instructed. In this case, the update data chain information memory area 23 stores as the chain data the destination memory area of the data so that the destination memory area is searched for through the data area prior to transfer.

In FIG. 4, the block information memory area 20 is constructed of an erase count memory area 24, a physical-logical block number memory area 25, and a memory area 26 for storing other information.

The erase count memory area 24 stores the count of erase operations that have been performed up until now. Since the flash memory 8A has the maximum erase cycles of 100000 to 1000000 times, the erase count memory area 24 having a memory capacity of 3 bytes or so is sufficient enough. The physical-logical block number memory area 25 stores a physical-logical block number. Unlike the physical block number (PEN), the physical-logical block number (PLBN) tags each block and each physical-logical block number will never be duplicated. Thus, one-to-one correspondence is assured between a physical block number and a physical-logical block number to be used for memory management. To manufacture a semiconductor disk card of 20 MB, for example, each physical-logical block number needs 2 bytes because the number of blocks is 320 or so.

The address calculation method in the embodiment 1 is now discussed. The address the host system 1 issues is in either the CHS format or LSA format. When an address is sent in the CHS format, the interface circuit 3 converts it into an LSA format address. Next, it is associated with a PSA. Specifically, a determination is made of which data memory area in which block is handled.

In a storage medium having data overwriting capability and with the erase count being of no interest, no problem arises at all even if memory management is performed in one-to-one correspondence (for example, when an LSA is 1, the corresponding PSA is also 1). The LSA is divided by the number of data areas within a management block (namely, an erase block). The address calculation is performed based on the resulting quotient as a physical block number and the remainder as an offset value within the physical block. The PSAs of read/write data are thus easily determined.

The first embodiment uses the method of equalizing the erase count in each block without using the logical/physical address conversion table. To this end, each block 9A has its own physical-logical block number (PLBN). The LSA sent from the host system 1 is divided by the number of the data block in the management block (namely, the erase block). The resulting quotient is used as a PLBN and the remainder as the offset value in the PLBN. In this way, the erase count in each block 9A is equalized by rewriting the physical-logical block number memory area 25 in the block 9A without using the address conversion table.

Figure 5:
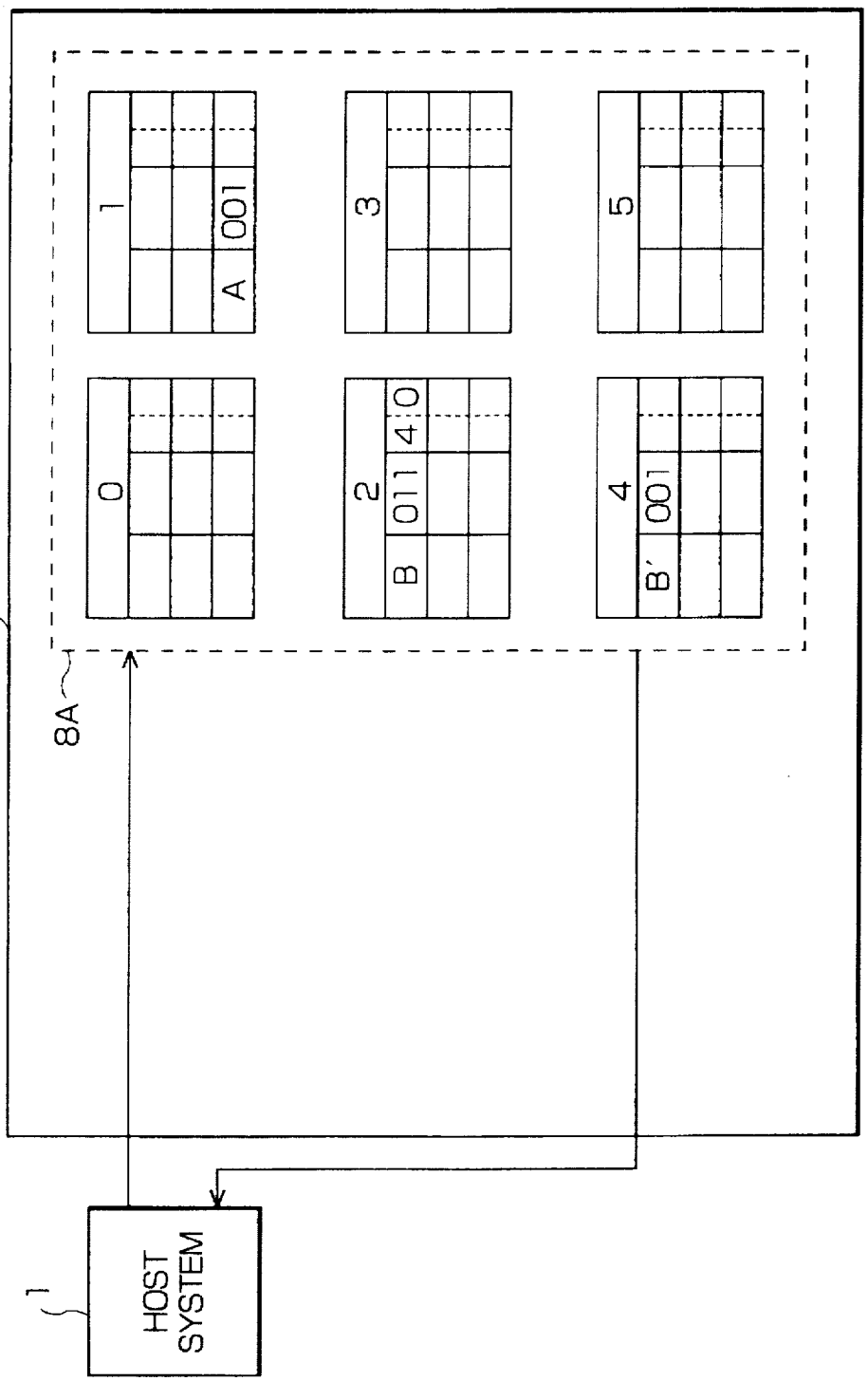
FIG. 5 is an explanatory diagram showing the data read operation according to embodiment 1 of the present invention.
Figure 6:
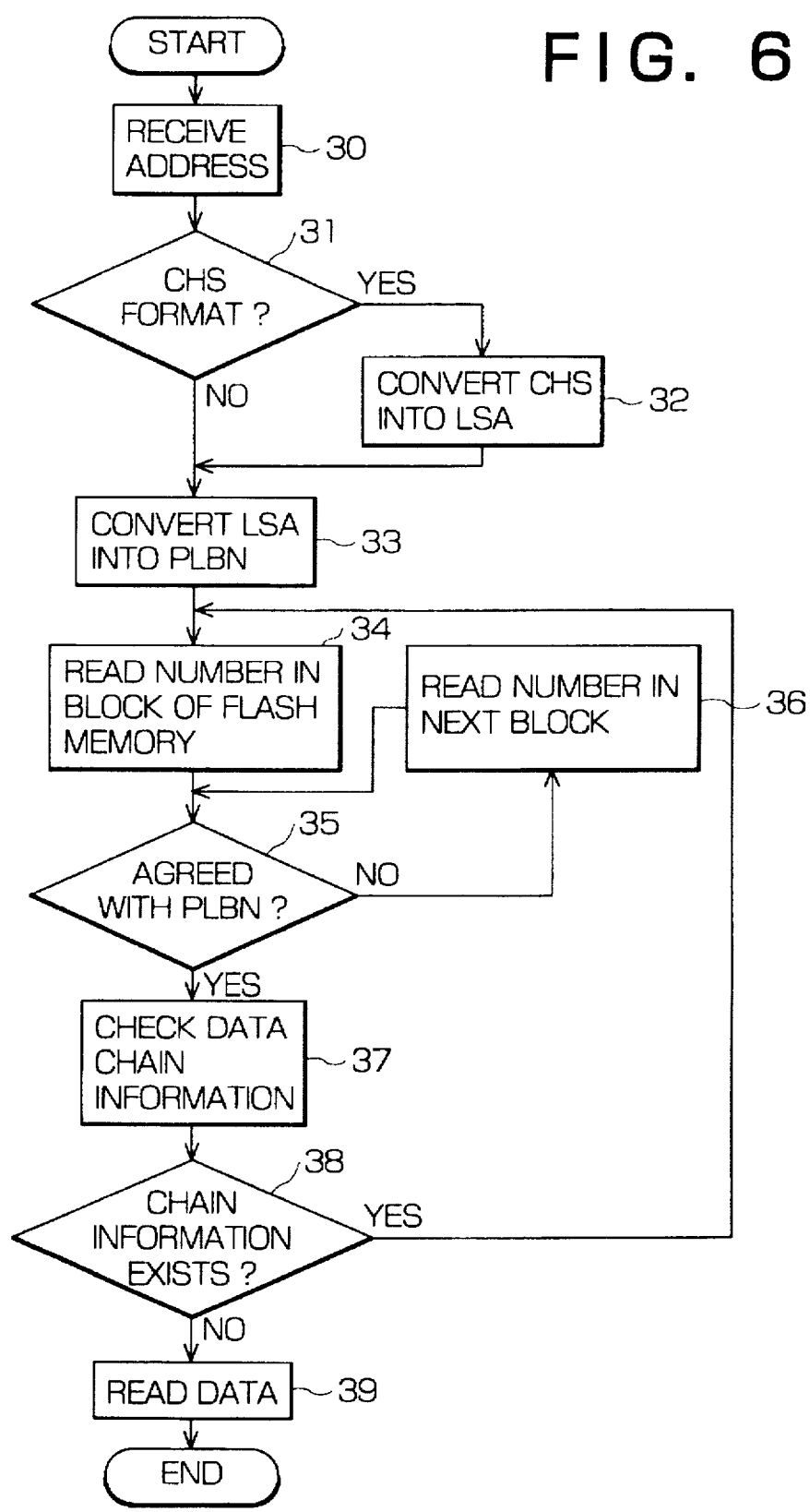
FIG. 6 is a flow diagram showing the data read operation according to embodiment 1 of the present invention.
Figure 7:
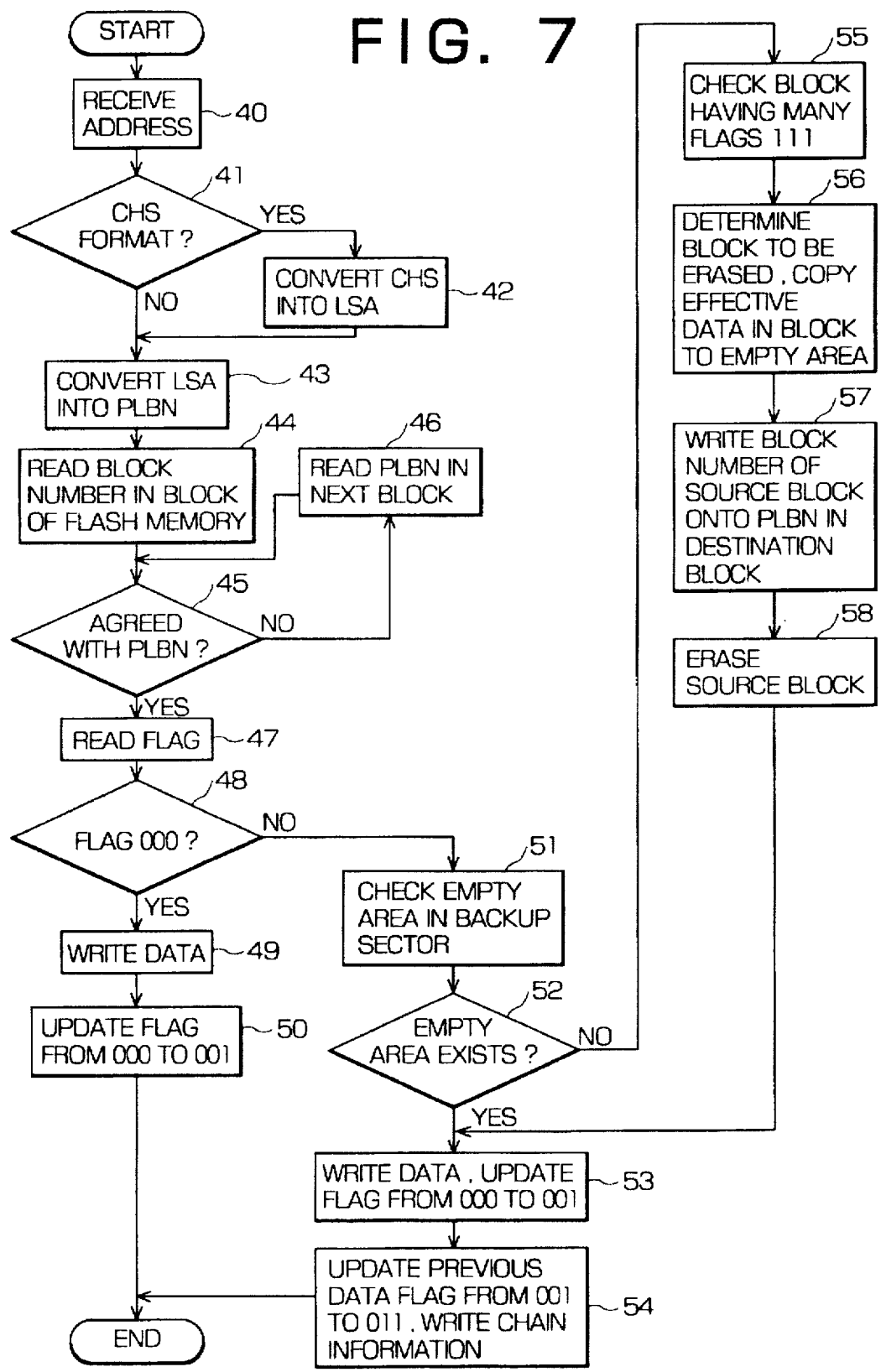
FIG. 7 is a flow diagram showing the data write operation according to embodiment 1 of the present invention.

The operation of the first embodiment is discussed referring to FIGS. 5 through 7. FIG. 5 shows the read operation of the first embodiment. FIG. 6 is the flow diagram showing the read operation of the first embodiment. FIG. 7 is the flow diagram showing the write operation of the first embodiment.

The data reading from the semiconductor disk device 2A is first discussed referring to FIGS. 5 and 6. As shown in FIG. 5, for convenience of explanation, the blocks 9A in the flash memory 8A are numbered with physical-logical block numbers (0 through 5) at the header portions; each of the blocks 9A has 3 data memory areas 21; and physical-logical blocks 4 and 5 are backups for data saving. If viewed from the host system 1, therefore, the capacity of the semiconductor disk device 2A is 512 bytes×3×4=6 kilobytes. LSAs sent from the host system 1 is 0 through 11.

The semiconductor disk device 1 receives the sector information of the data to be read (step 30). This information is in either the LSA format or the CHS format. To standardize the formats to the LSA format, the sector information sent in the CHS format is converted into LSA format data (steps 31–32). This conversion may be performed by CPU 4 in the semiconductor disk device 2A or by a dedicated circuit disposed in the semiconductor disk device 2A. The LSA format data is then converted into PLBN data (step 33). The calculation method for this conversion is as already described. This conversion may be also performed by CPU 4 or a dedicated circuit.

The above process results in the PLBN and its offset value. Which block 9A in the flash memory 8A the PLBN finally obtained corresponds to is determined (step 34 through 36). First, which block 9A's information memory area 20 in the flash memory 8A houses the target physical-logical block number is determined.

Suppose that the data, LSA=5, is input from the host system 1. According to PLBN conversion, the physical-logical block number=5/3=1, and the offset value=5−(1×3)=2. Both are expressed as (1, 2), hereinafter. Furthermore, the chain information is read from the update data chain information memory area 23 (steps 37–38). No chain information is stored, and the data to be read is A (step 39).

When the data, LSA=6, is input from the host system 1, PLBN conversion results in (2, 0). The update data chain information memory area 23 at the address (2, 0), storing 40, means that the data is transferred to the offset 0 at the physical-logical block number 4. Accordingly, the data to be read is found to be B' (steps 38, 34, 35, 37 through 39).

In the semiconductor disk device having a flash memory of 20 megabytes (the size of block 64 kilobytes), the maximum number of blocks to be searched is equal to the number of blocks in the semiconductor disk device, thereby being 20 megabytes/64 kilobytes=320. The maximum number of blocks is 320. Files are usually written over continued disk areas, and a next search starts with the current block 9A. The number of files to be searched, in practice, is thus dramatically reduced.

In the embodiment 2, this action is performed according to a table. In this case, the size of the table is approximately one-two-hundred-twenty-seventh (1/227) that of the prior art logical/physical address conversion table. If the table is constructed of an SRAM, however, data is lost when power is interrupted. Thus, the RAM table should be reconstructed by making CPU check the correspondence between the physical-logical block number and the physical block number, when the semiconductor disk device is turned on again.

The data writing to the semiconductor disk device 2A is now discussed referring to FIG. 7. Steps 40 through 46 in FIG. 7 are identical to steps 30 through 36 in FIG. 6, and their explanation will not be repeated. When the data status flag 22 read is 000, data is written onto the data memory area 21, causing its data status flag to change to 001 (steps 47 through 50).

When the data status flag 22 is not 000 at step 48, namely, when the host system 1 instructs overwriting (updating) onto the data memory area 21 that has its data already written, data is written onto any other data memory area 21 that is empty in the same block 9A, and its corresponding data status flag 22 is set to 001. The data status flag 22 of the data memory area 21 that has the data already written is shifted from 001 to 011. The physical-logical block number and its offset value to which the data is newly written are written on the update data chain information memory area 23 (steps 48, 51 through 54). Thus, by tracing the chain, the latest data is read.

When no empty data memory areas 21 are available in the same block 9A, a block 9A that contains many data status flags 711 is searched for. The data status flag 111 is written by a delete instruction. Transfer of blocks 9A is involved (steps 52, 55 through 58). The erase count is also taken into consideration.

First, data in the source, namely, in the block 9A that has been found to meet the above condition in the search action is transferred to a destination block 9A that is empty. The data that has been rendered unnecessary in the course of writing is not transferred. The offset value of the data to be transferred in the source block 9A is set to agree with the offset value in the destination source block 9A. Chain data, if any, is also written at the same time. When the transfer of the data is completed, the physical-logical block number in the source block is written onto the physical-logical block number memory area 25 in the destination block 9A. The source block 9A is then erased.

The embodiment 1 dispenses with the logical sector/physical sector address conversion table without degrading the performance of the prior art disk card. Without the address conversion table, the memory capacity of the semiconductor disk card is easily enlarged. With the prior art address conversion table incorporated, the semiconductor disk device of 20 megabytes would require an address table of 80 kilobytes, and the semiconductor disk device of 40 megabytes would require an address table of 160 kilobytes (1.25 megabits). Without the address conversion table, the cost for the SRAM is completely eliminated. A flash memory may be accommodated in the space, which would otherwise be occupied by an SRAM for the address conversion table. As a result, the memory capacity of the semiconductor disk device is increased.

Embodiment 2

Figure 8:
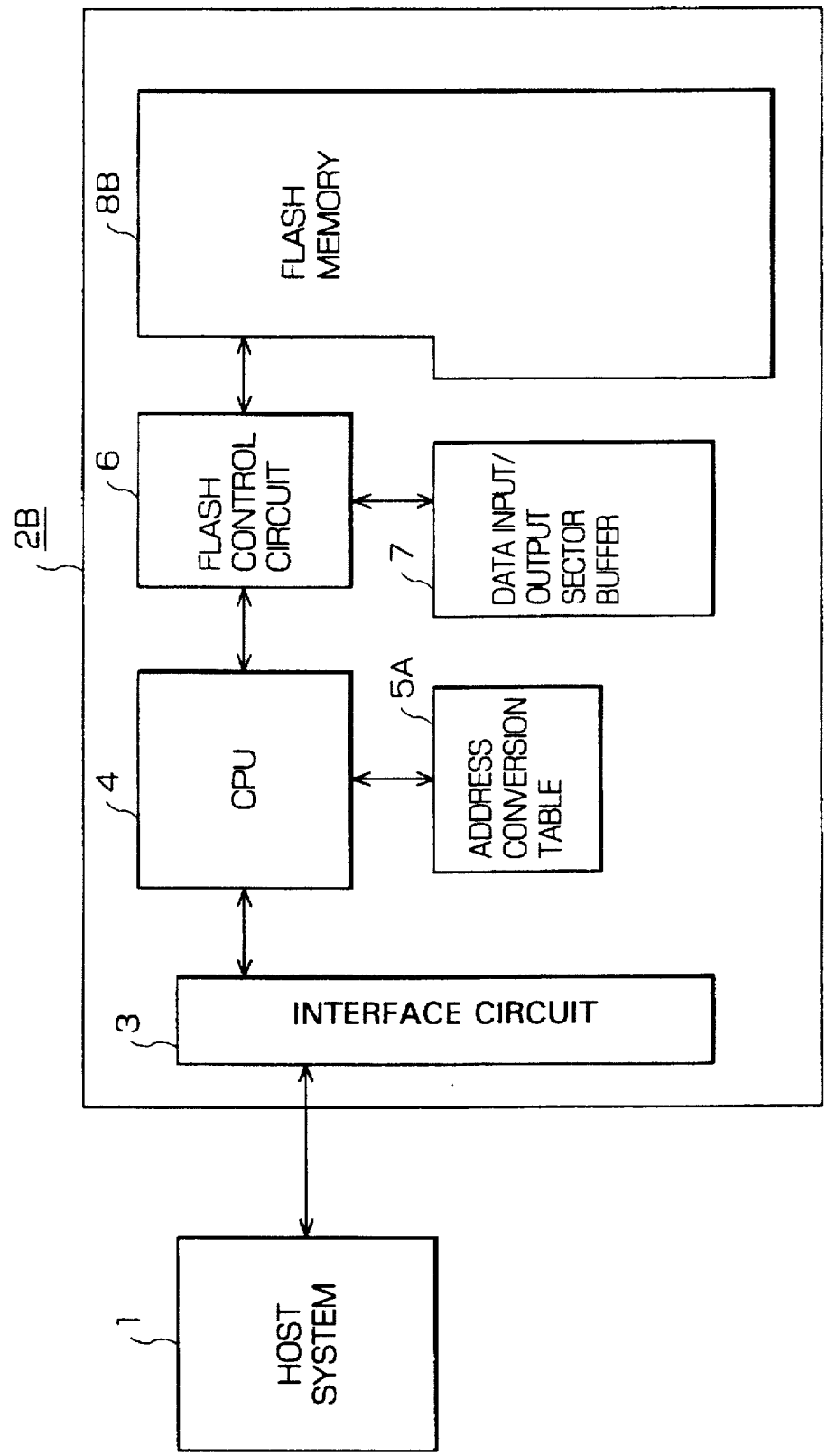
FIG. 8 is a block diagram showing generally the construction of embodiment 2 of the present invention.
Figure 9:
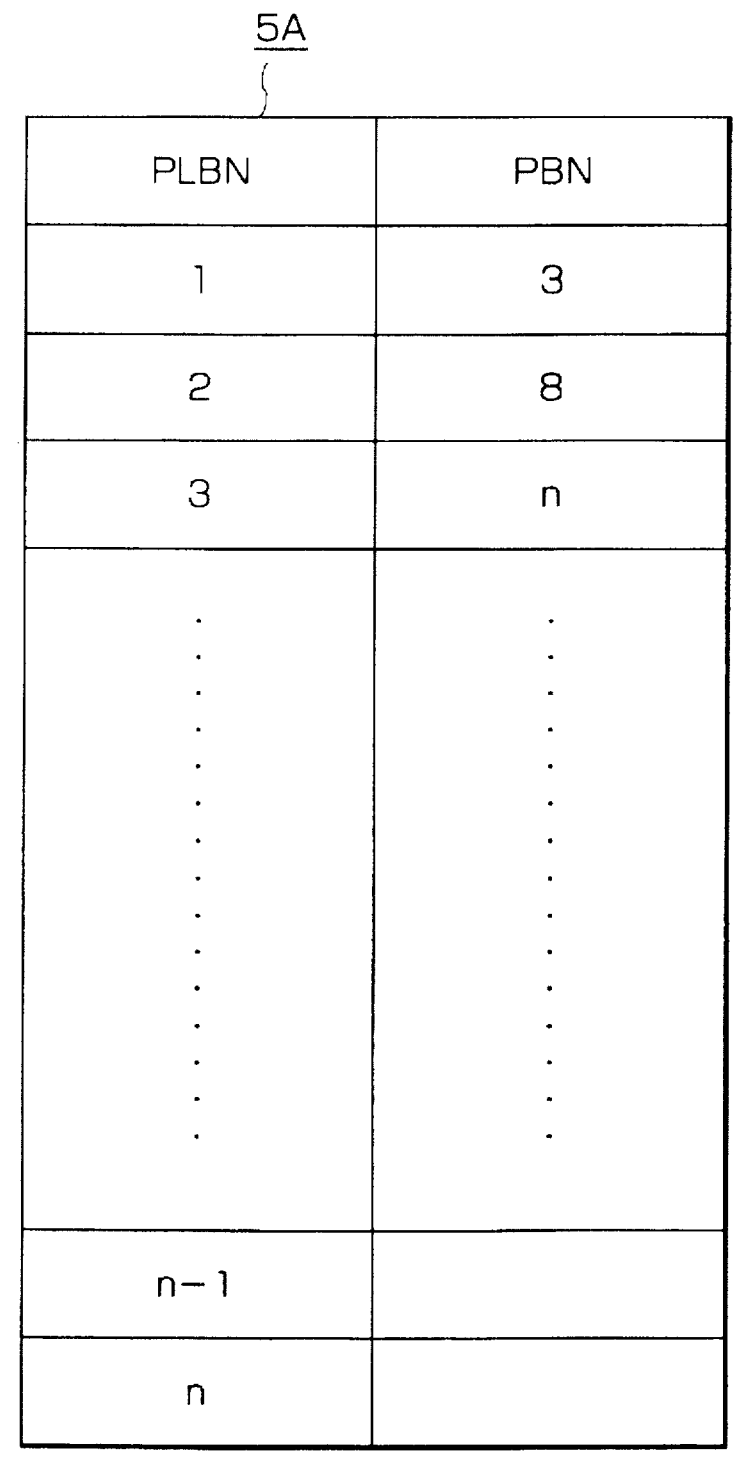
Figure 10:
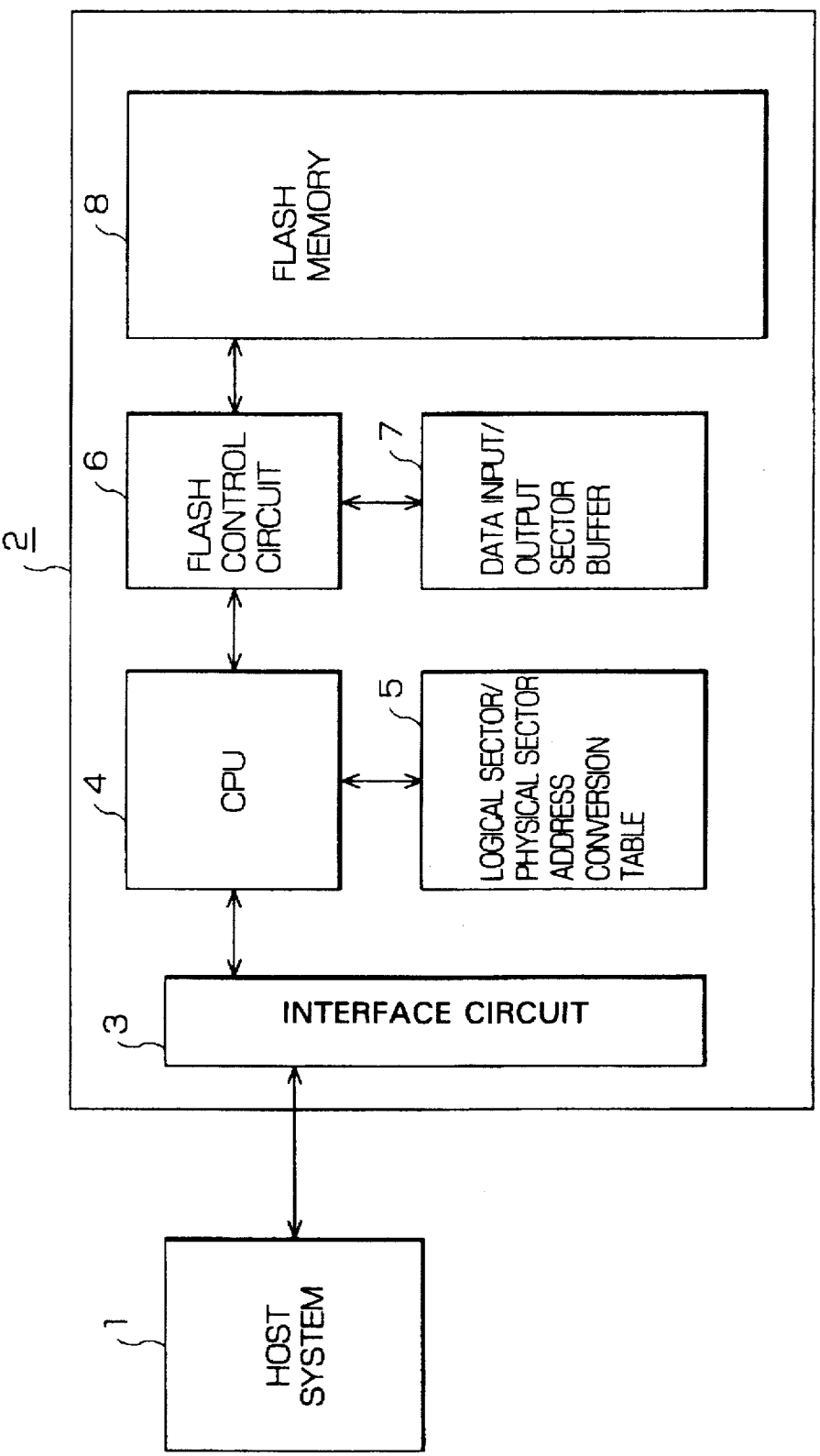
FIG. 10 is the block diagram showing the prior art semiconductor disk device.
Figure 12:
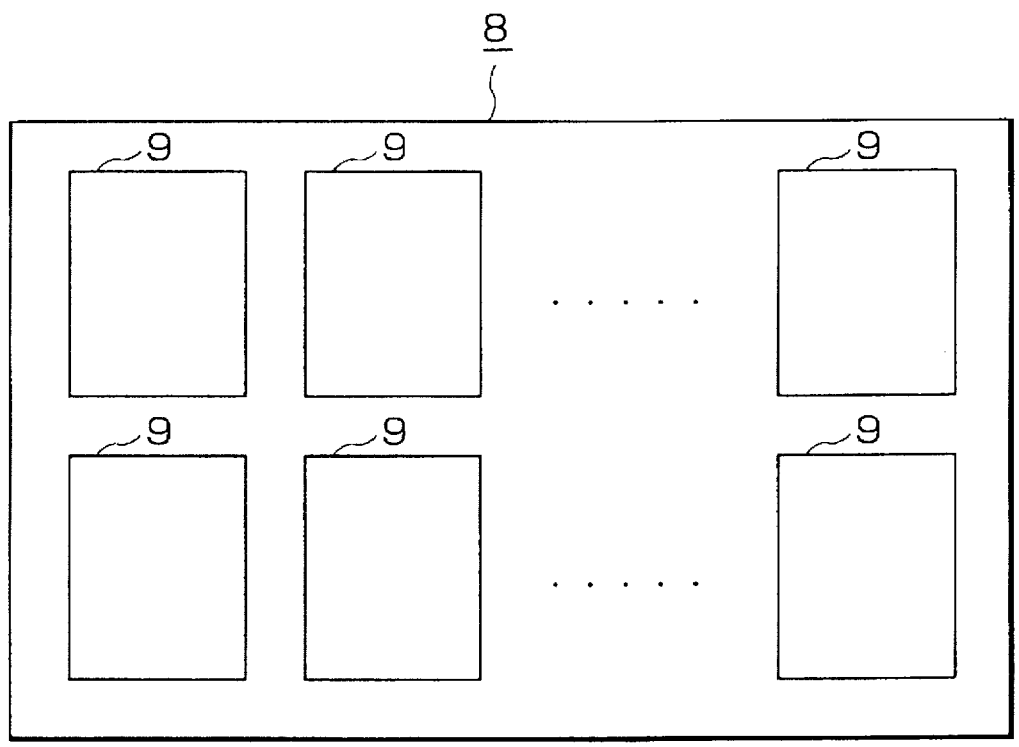
FIG. 12 shows the construction of the flash memory of the prior art semiconductor disk device.
Figure 13:
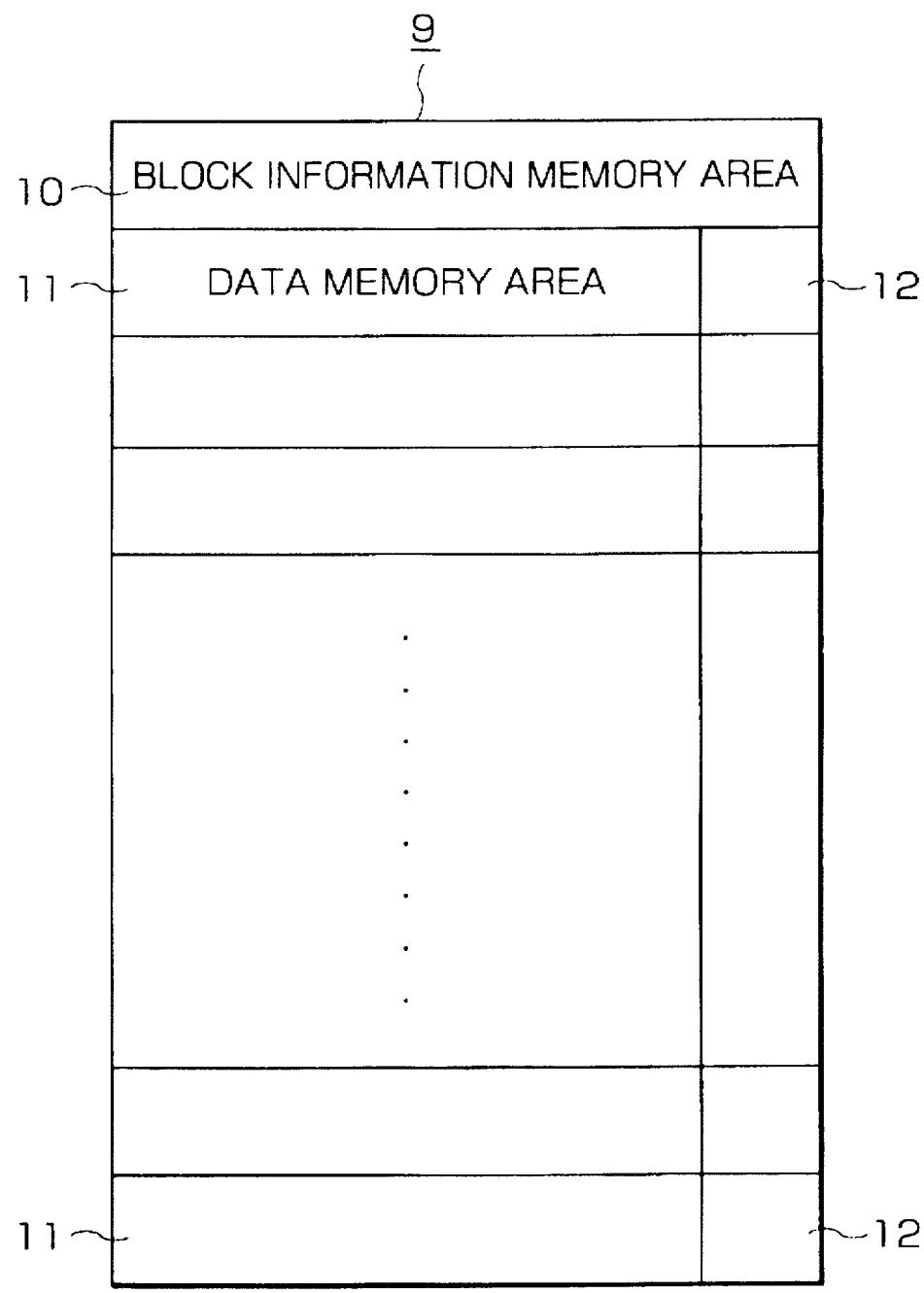
FIG. 13 shows the block in the flash memory of the prior art semiconductor disk device.
Figure 14:
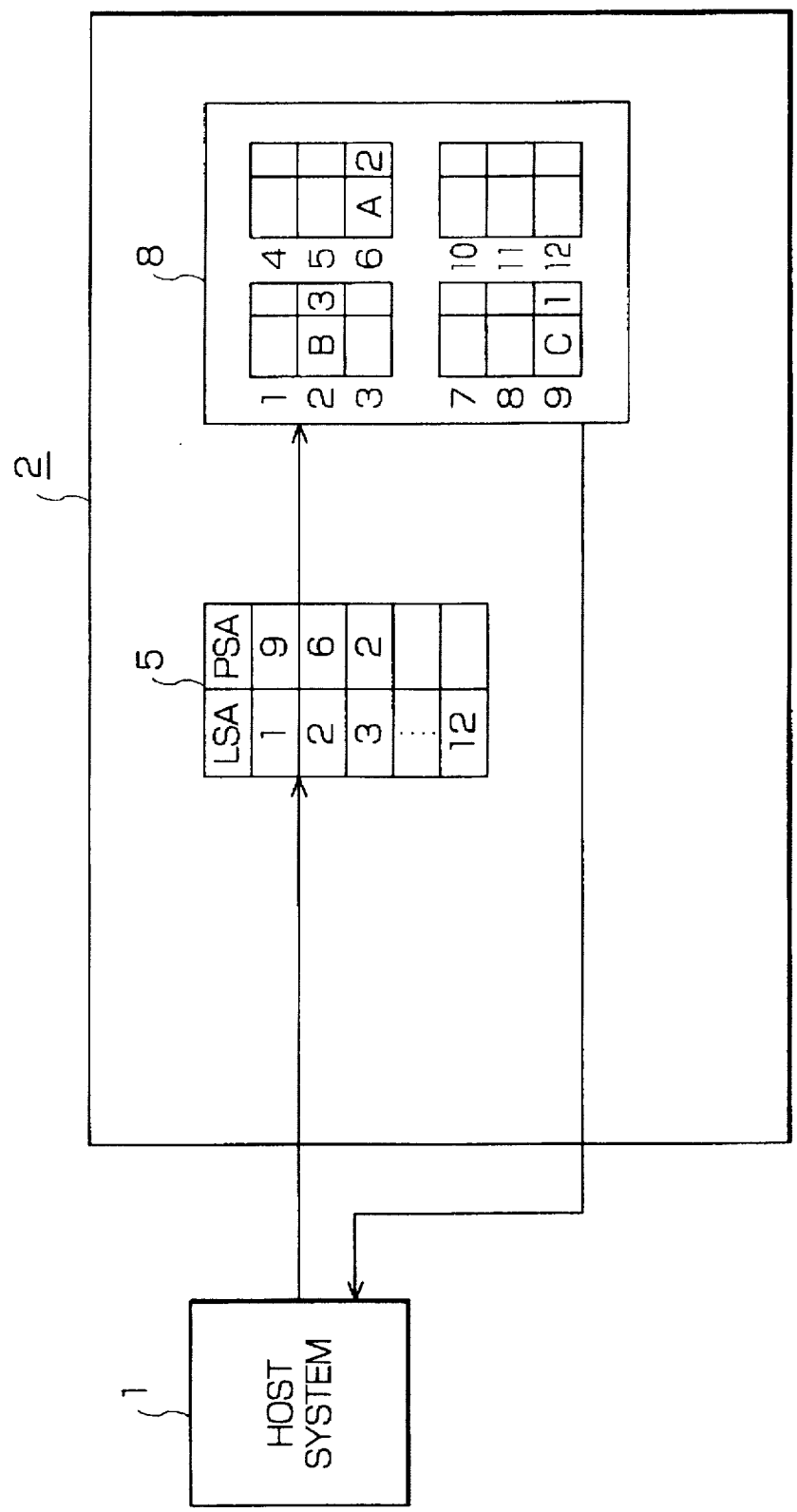
FIG. 14 shows the data read operation of the prior art semiconductor disk device.

The embodiment 2 of the present invention is now discussed referring to FIGS. 8 and 9. FIG. 8 is the block diagram showing generally the construction of the embodiment 2. FIG. 9 shows the internal construction of the address conversion table of the semiconductor disk device of FIG. 8.

In FIG. 8, the semiconductor disk device 2B of the embodiment 2 comprises an interface circuit 3, CPU 4, an address conversion table 5A, a flash control circuit 6, a data input/output buffer 7, and a flash memory 8B.

In FIG. 9, the address conversion table 5A is constructed of a physical-logical block number (PLBN) memory area and a physical block number (PBN) memory area.

The capacity of the address conversion table 5A is as follows:

When a flash memory 8B of 20 megabytes having 64 kilobytes a block (erase block) is used, the number of blocks in the semiconductor disk device 2B is calculated as follows:

Number of blocks in the semiconductor disk device =20 megabytes/64 kilobytes=320 blocks The number of bits required to express 320 in binary is in 320/1n 2=9. Thus, 9 bits are required. The required memory capacity of the address conversion table 5A is 320×9=2880 bits, namely 360 bytes. This figure is approximately one-two-hundred-twenty-seventh (1/227) its prior art counterpart.

Most of the operation of the embodiment 2 remains unchanged from that of the embodiment 1. The difference is that the blocks 9A in the flash memory 8B are directly accessed according to the address conversion table 5A in the embodiment 2.

The embodiment 2 thus advantageously works with a small-capacity address conversion table without degrading the performance of the semiconductor disk device. The small-capacity address conversion table results in a large-capacity semiconductor disk device at no expense. With the prior art address conversion table incorporated, the semiconductor disk device of 20 megabytes would require an address table of 80 kilobytes, and the semiconductor disk device of 40 megabytes would require an address table of 160 kilobytes (7.25 megabits). Since this size of memory is reduced to one-two-hundred-twenty-seventh (1/227) the prior art counterpart, the cost for the SRAM is reduced. A flash memory may be accommodated in the space, which would otherwise be occupied by the SRAM for the address conversion table. As a result, the memory capacity of the semiconductor disk device is increased.

What is claimed is:

1. A semiconductor disk device comprising:

a non-volatile, electronically programmable and erasable flash memory, the flash memory being erasable by blocks, interface means for exchanging data and addresses with an external system, flash control buffer means for performing data exchange between the flash memory and the interface means, and access means for converting a sector address received from the external system into a logical block number and for accessing the flash memory according to the logical block number.

2. The semiconductor disk device according to claim 1, wherein said flash memory includes a plurality of blocks, each block comprising a physical-logical block number memory area for storing a physical-logical block number and a plurality of data memory areas for storing data, said sector address includes a logical sector address, and said access means converts the logical sector address received from the external system into a physical-logical block number and its offset value and searches the block having the same physical-logical block number to access target data.

3. The semiconductor disk device according to claim 2, wherein said flash memory includes a plurality of update data chain information memory areas, each one of the plurality of update data chain information memory areas corresponding to one of the plurality of data memory areas, the data chain information memory areas containing information indicative of destination of data, and wherein said flash memory includes a plurality of data status flag memory areas, each one of the plurality of data status flag memory areas corresponding to one of the plurality of data memory areas, for storing a data status flag that indicates whether the update data chain information memory area stores the chain information and whether the data memory area stores data, whereby said access means accesses data in the flash memory based on the physical-logical block number, the data status flag and the chain information.

4. The semiconductor disk device according to claim 3, wherein, after finding the block and the data memory area in the flash memory based on the physical-logical block number and offset value, said access means reads the content of the data memory areas when the data status flag in the data status flag memory areas corresponding to the data memory areas indicates that no chain information is stored, and said access means reads the content of the data memory areas based on the chain information in the update data chain information memory area when the data status flag indicates that the chain information is stored.

5. The semiconductor disk device according to claim 3, wherein, after finding the block and the data memory area in the flash memory based on the physical-logical block number and offset value, said access means causes the data status flag to be indicative of an occupied state by writing data onto the data memory area when the data status flag in the data status flag memory area indicates that no data is stored in the data memory area, and when the data status flag indicates that data is stored in the data memory area, said access means searches for an empty data memory area, writes data onto the empty data memory area, and then causes the data status flag corresponding to the data memory area just written to be indicative of an occupied state, and at the same time writes chain information onto the update data chain information memory area corresponding to the data memory area having stored data.

6. The semiconductor disk device according to claim 1 further comprising an address conversion table for converting a physical-logical block number into a physical block number, wherein said flash memory includes a plurality of blocks, each block comprising a physical-logical block number memory area for storing a physical-logical block number and a plurality of data memory areas for storing data, said sector address information includes a logical sector address, and said access means converts the logical sector address coming in from the external system into a physical-logical block number and its offset value, converts the physical-logical block number into a physical block number referring to the address conversion table, and accesses target data based on the physical block number and the offset value.

7. The semiconductor disk device according to claim 6, wherein said block further comprises update data chain information memory areas, one disposed corresponding to each of said data memory areas, for storing chain information indicative of the destination of data, and data status flag memory areas, one disposed corresponding to each of said data memory areas, for storing a data status flag that indicates whether said update data chain information memory area stores chain information and whether said data memory area stores data, whereby said access means accesses data in the flash memory based on the physical-logical block number, the data status flag and the chain information.

8. The semiconductor disk device according to claim 7, wherein, after finding the block and the data memory area in the flash memory based on the physical-logical block number and offset value, said access means reads the content of the data memory area when the data status flag in the data status flag memory area indicates that no chain information is stored, and said access means reads the content of the destination data memory area based on the chain information in the update data chain information memory area when the data status flag indicates that the chain information is stored.

9. The semiconductor disk device according to claim 7, wherein, after finding the block and the data memory area in the flash memory based on the physical-logical block number and offset value, said access means causes the data status flag to be indicative of an occupied state by writing data onto the data memory area when the data status flag in the data status flag memory area indicates that no data is stored in the data memory area, and when the data status flag indicates that data is stored in the data memory area, said access means searches for an empty data memory area, writes data onto the empty data memory area, and then causes the data status flag corresponding to the data memory area just written to be indicative of an occupied state, and at the same time writes chain information onto the update data chain information memory area corresponding to the data memory area that has stored data.

* * * * *

UNITED STATES PATENT AND TRADEMARK OFFICE
CERTIFICATE OF CORRECTION

PATENT NO.    : 5,627,783
DATED         : May 6, 1997
INVENTOR(S)   : Miyauchi

It is certified that error appears in the above-indentified patent and that said Letters Patent is hereby corrected as shown below:

Column 9, Line 55, change "its" to --an--;

Column 10, Line 20, after "memory" delete --based on the physical-logical block number and offset value--.

Signed and Sealed this

Nineteenth Day of August, 1997

Attest:

BRUCE LEHMAN

Attesting Officer

Commissioner of Patents and Trademarks